US012305428B2

(12) United States Patent
Chen et al.

(10) Patent No.: US 12,305,428 B2
(45) Date of Patent: May 20, 2025

(54) FURNITURE ASSEMBLY

(71) Applicants: KING SLIDE WORKS CO., LTD., Kaohsiung (TW); KING SLIDE TECHNOLOGY CO.,LTD., Kaohsiung (TW)

(72) Inventors: Ken-Ching Chen, Kaohsiung (TW); Shih-Lung Huang, Kaohsiung (TW); Yi-Syuan Jhao, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 47 days.

(21) Appl. No.: 18/377,290

(22) Filed: Oct. 5, 2023

(65) Prior Publication Data

US 2024/0376749 A1 Nov. 14, 2024

(30) Foreign Application Priority Data

May 12, 2023 (TW) ................................ 112117998

(51) Int. Cl.
*E05B 65/464* (2017.01)
*A47B 97/00* (2006.01)

(52) U.S. Cl.
CPC ...... *E05B 65/464* (2013.01); *A47B 2097/008* (2013.01)

(58) Field of Classification Search
CPC .... E05B 65/462; E05B 65/463; E05B 65/464; A47B 88/50; A47B 2210/0086; A47B 2097/008
See application file for complete search history.

(56) References Cited

U.S. PATENT DOCUMENTS 7,320,507 B2 1/2008 White
2008/0061663 A1 3/2008 Wu
2009/0015115 A1 1/2009 Van Wijk
2023/0383576 A1* 11/2023 Pohlmann ............. E05B 65/464
(Continued)

FOREIGN PATENT DOCUMENTS

CN 210714195 U * 6/2020
CN 112932119 A * 6/2021 ............. A47B 88/40
(Continued)

*Primary Examiner* — Andrew Roersma
(74) *Attorney, Agent, or Firm* — Winston Hsu

(57) ABSTRACT

A furniture assembly includes a first object, a second object, a self-closing device, an aiding member, an interlock mechanism and an actuating part. The second object is displaceable relative to the first object. The self-closing device is arranged on the first object and includes a base, a working member and a resilient member. The working member and the aiding member are movable relative to the base. The interlock mechanism is arranged on the first object. The actuating part is arranged on the second object. When the second object is located at the extended position and the working member returns to an initial position from an engaging position in response to a self-closing resilient force provided by the resilient member, the aiding member is located at a predetermined position to retain at least one locking member of the interlock mechanism at a locking position.

10 Claims, 14 Drawing Sheets

(56) References Cited

U.S. PATENT DOCUMENTS

| | | | | |
|---|---|---|---|---|
| 2024/0081528 | A1* | 3/2024 | Xu | A47B 88/50 |
| 2024/0167301 | A1* | 5/2024 | Behrmann | E05B 65/464 |
| 2024/0279963 | A1* | 8/2024 | Zhan | E05B 65/464 |
| 2024/0418013 | A1* | 12/2024 | Chen | E05B 65/464 |

FOREIGN PATENT DOCUMENTS

| | | | | | |
|---|---|---|---|---|---|
| CN | 218355199 | U | * | 1/2023 | |
| CN | 218390326 | U | * | 1/2023 | |
| CN | 218438803 | U | * | 2/2023 | |
| CN | 116658000 | A | * | 8/2023 | |
| JP | 2002-527167 | A | | 8/2002 | |
| JP | 2005-504905 | A | | 2/2005 | |
| JP | 3173757 | U | | 2/2012 | |
| WO | 00/22266 | A1 | | 4/2000 | |
| WO | 03/031753 | A1 | | 4/2003 | |
| WO | WO-2022173359 | A1 | * | 8/2022 | E05B 65/463 |

* cited by examiner

FURNITURE ASSEMBLY

BACKGROUND OF THE INVENTION

1. Field of the Invention

The present invention relates to a furniture assembly, and more specifically, to a furniture assembly having an interlock function.

2. Description of the Prior Art

With development of the industrial technology, there are various furniture products having interlock functions available in the market. As for a cabinet system, the cabinet system usually includes a cabinet body and a plurality of drawers, wherein when one of the plurality of drawers is opened relative to the cabinet body, the other of the plurality of drawers is locked for preventing falling of the cabinet body caused by two or more drawers being opened at the same time. Besides, the cabinet system usually further includes a plurality of slide rail assemblies mounted on the cabinet body and for supporting the plurality of the drawers.

For example, in U.S. Pat. No. 7,320,507 B2, it discloses an interlock device adapted for a cabinet system. The interlock device is mounted on a rear portion of a slide rail assembly. The interlock device includes a shell and a plate movably relative to the shell. The plate can be driven by an inner rail of the slide rail assembly, which is configured to support a drawer, to abut against two actuators, which are respectively located adjacent to an upper side and a lower side of an outer rail of the slide rail assembly, for locking inner rails of other slide rail assemblies, so as to achieve an interlock function. However, when the plate is disengaged to move rearward, the plate fails to abut against the actuators, which cause a malfunction of the interlock device.

Therefore, in order to meet various requirements, it becomes an important topic to provide a furniture assembly having an improved interlock mechanism.

SUMMARY OF THE INVENTION

It is an objective of the present invention to provide a furniture assembly with an interlock function.

According to an aspect of the present invention, a furniture assembly includes a first object, a second object, a self-closing device, an aiding member, an interlock mechanism and an actuating part. The second object is displaceable relative to the first object. The self-closing device is arranged on the first object. The self-closing device includes a base, a working member and a resilient member. The working member is movable relative to the base. The aiding member is movable relative to the base of the self-closing device. The interlock mechanism is arranged on the first object, and the interlock mechanism includes at least one locking member. The actuating part is arranged on the second object. When the second object is displaced from a retracted position toward an extended position, the actuating part drives the working member to move from an initial position to an engaging position, and when the actuating part drives the working member to move from the initial position to the engaging position, the resilient member generates a self-closing resilient force and the aiding member is driven to move from a first predetermined position to a second predetermined position. When the second object is located at the extended position and the working member returns to the initial position from the engaging position in response to the self-closing resilient force provided by the resilient member, the aiding member is located at the second predetermined position to retain the at least one locking member of the interlock mechanism at a locking position.

According to another aspect of the present invention, a furniture assembly includes a first object, a second object, a self-closing device, an aiding member, an interlock mechanism and an actuating part. The second object is displaceable relative to the first object. The self-closing device is arranged on the first object. The self-closing device includes a base, a working member and a resilient member. The working member is movable relative to the base. The aiding member is movable relative to the base of the self-closing device. The interlock mechanism is arranged on the first object, and the interlock mechanism includes at least one locking member. The actuating part is arranged on the second object. When the second object is displaced from a retracted position toward an extended position, the actuating part drives the working member to move from an initial position to an engaging position, and when the actuating part drives the working member to move from the initial position to the engaging position, the resilient member generates a self-closing resilient force and the aiding member is driven to move from a first predetermined position to a second predetermined position to retain the at least one locking member of the interlock mechanism at a locking position. During a displacement of the second object from the extended position toward the retracted position, the actuating part engages with the working member, such that when the working member returns to the initial position from the engaging position in response to the self-closing resilient force provided by the resilient member, the working member drives the second object to move back to retracted position by an engagement of the actuating part and the working member, so as to drive the aiding member to move from the second predetermined position to the first predetermined position.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The members of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct mechanical connection. Thus, if a first device is connected to a second device, that connection may be through a direct mechanical connection, or through an indirect mechanical connection via other devices and connections.

Figure 1:
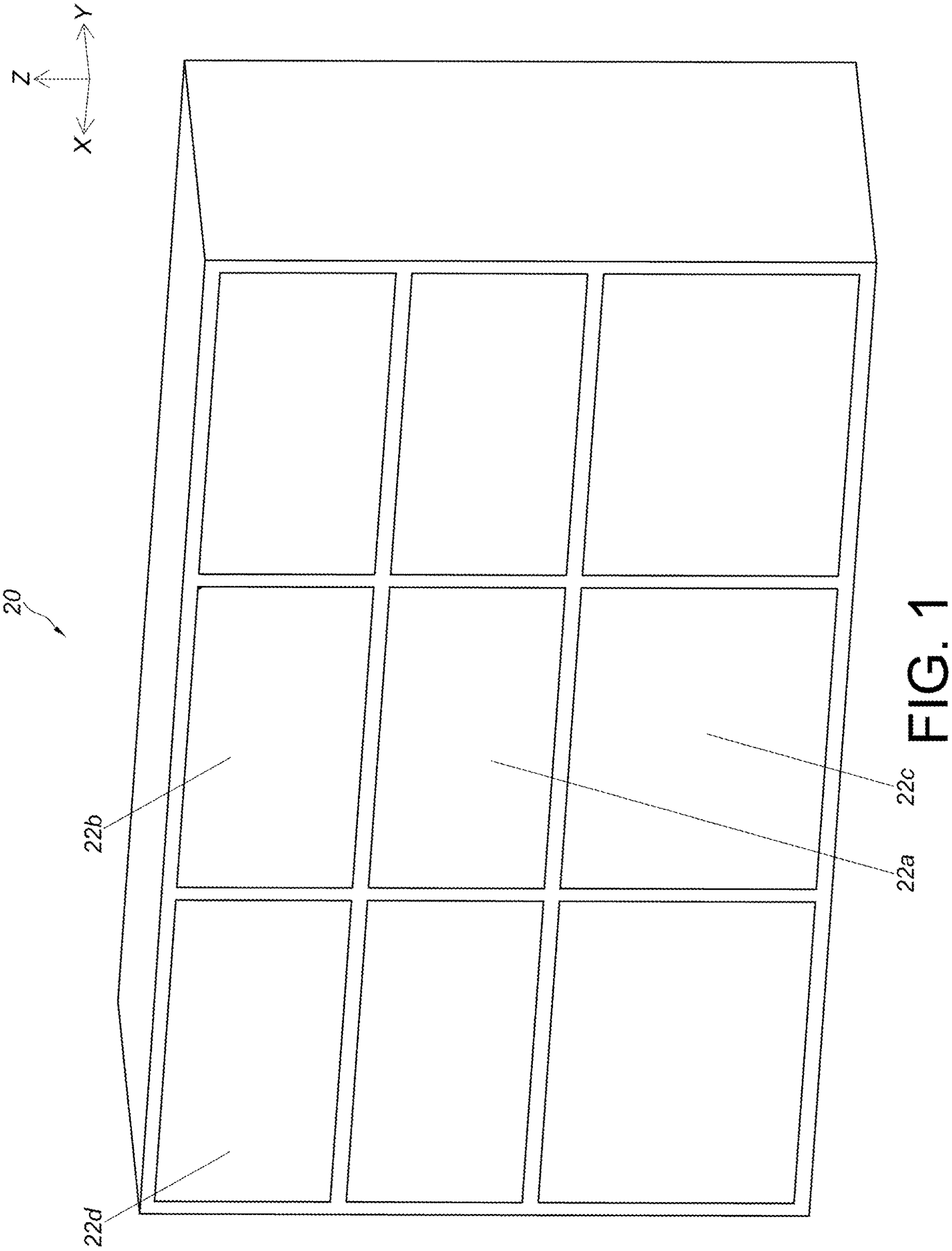
FIG. 1 is a diagram of a cabinet system according to a first embodiment of the present invention.

As shown in FIG. 1, a cabinet system includes a cabinet body 20 and a plurality of drawers, e.g., a first drawer 22*a*, a second drawer 22*b*, a third drawer 22*c* and a fourth drawer 22*d*, arranged on the cabinet body 20 along a vertical direction and/or a transverse direction.

Figure 2:
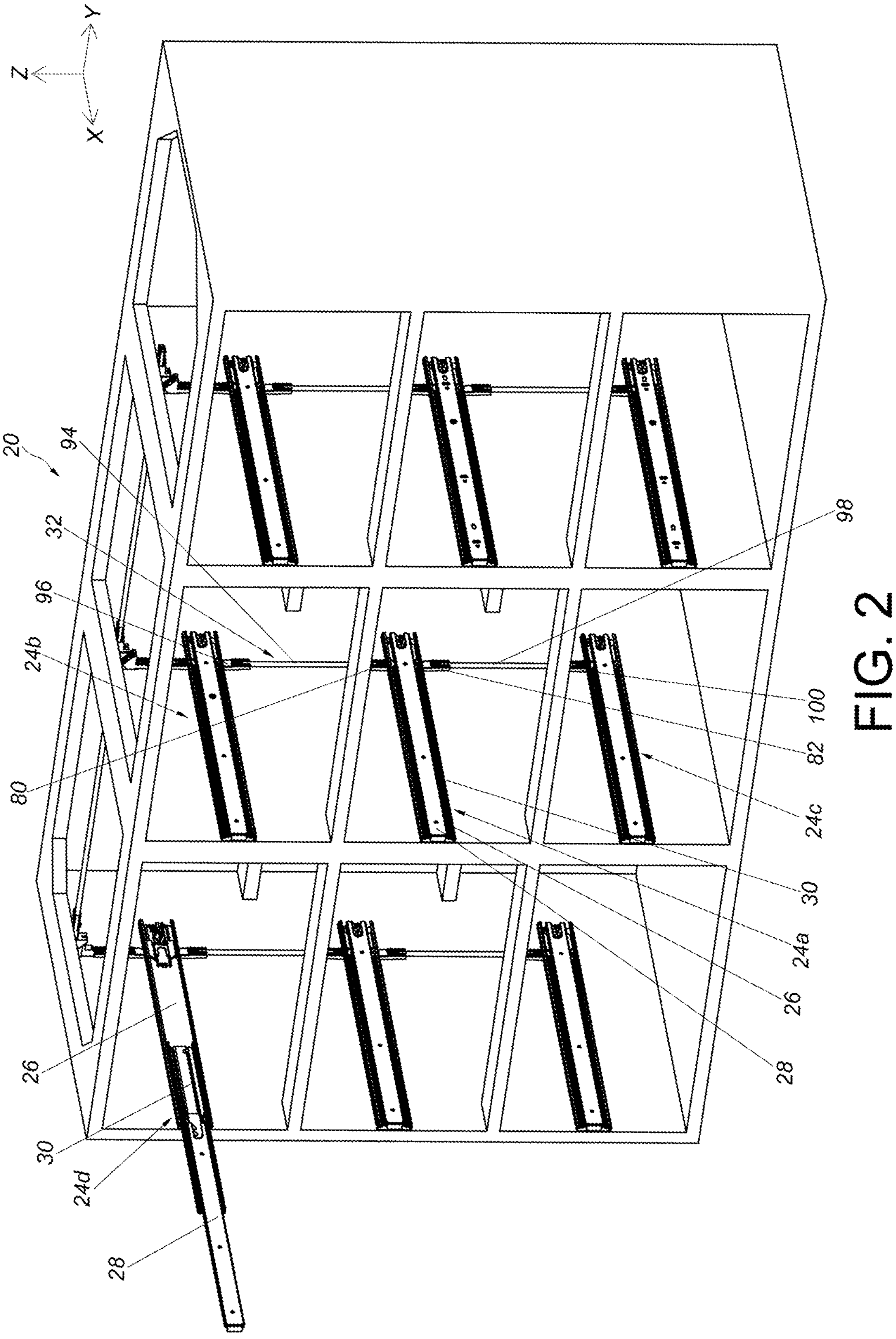
FIG. 2 is a partial diagram of the cabinet system according to the first embodiment of the present invention.

As shown in FIG. 2, the cabinet system further includes a plurality of furniture assemblies, e.g., a first furniture assembly 24*a*, a second furniture assembly 24*b*, a third furniture assembly 24*c* and a fourth furniture assembly 24*d*, arranged on the cabinet body 20 and configured to support the plurality of drawers, e.g., the first drawer 22*a*, the second drawer 22*b*, the third drawer 22*c* and the fourth drawer 22*d*, respectively. The first furniture assembly 24*a*, the second furniture assembly 24*b*, the third furniture assembly 24*c* and the fourth furniture assembly 24*d* can have similar structures. Each of the first furniture assembly 24*a*, the second furniture assembly 24*b*, the third furniture assembly 24*c* and the fourth furniture assembly 24*d* includes a first object 26 and a second object 28 displaceable relative to the first object 26 along a longitudinal direction. In this embodiment, by way of example, each of the first object 26 and the second object 28 can be a slide rail. The longitudinal direction can be defined by a length direction or a displacing direction of the slide rail and parallel to an X axis. The transverse direction can be defined by a lateral direction or a width direction of the slide rail and parallel to a Y axis. The vertical direction can be defined by a height direction of the slide rail and parallel to a Z axis.

Preferably, each of the first furniture assembly 24*a*, the second furniture assembly 24*b*, the third furniture assembly 24*c* and the fourth furniture assembly 24*d* further includes a third object 30 movably mounted between the first object 26 and the second object 28 and for extending a displacement of the second object 28 relative to the first object 26. In this embodiment, by way of example, the first object 26, the second object 28 and the third object 30 can form a three-section slide rail assembly, and the first object 26, the second object 28 and the third object 30 can be a fixed rail, a movable rail and a middle rail of the three-section slide rail assembly, respectively. Understandably, in another embodiment, the third rail can be omitted, and the first object and the second object can form a two-section slide rail assembly.

Preferably, the first objects 26 of the first furniture assembly 24*a*, the second furniture assembly 24*b*, the third furniture assembly 24*c* and the fourth furniture assembly 24*d* are mounted or fixed on the cabinet body 20. The second objects 28 of the first furniture assembly 24*a*, the second furniture assembly 24*b*, the third furniture assembly 24*c* and the fourth furniture assembly 24*d* are configured to support the first drawer 22*a*, the second drawer 22*b*, the third drawer 22*c* and the fourth drawer 22*d*, respectively. In such a way, the first drawer 22*a*, the second drawer 22*b*, the third drawer 22*c* and the fourth drawer 22*d* can be retracted or opened relative to the cabinet body 20 by the first furniture assembly 24*a*, the second furniture assembly 24*b*, the third furniture assembly 24*c* and the fourth furniture assembly 24*d*, respectively. For example, when the second object 28 of the first furniture assembly 24*a* is retracted relative to the first object 26 of the first furniture assembly 24*a*, the first drawer 22*a* is retracted relative to the cabinet body 20. Alternatively, when the second object 28 of the fourth furniture assembly 24*d* is retracted relative to the first object 26 of the fourth furniture assembly 24*d*, the fourth drawer 22*d* is retracted relative to the cabinet body 20.

As for the first furniture assembly 24*a*, the first furniture assembly 24*a* is located between the second furniture assembly 24*b* and the third furniture assembly 24*c* along the vertical direction, and the first furniture assembly 24*a* further includes an interlock mechanism 32 configured to cooperate with the second furniture assembly 24*b* and the third furniture assembly 24*c*. When the second object 28 of the first furniture assembly 24*a* is opened relative to the first object 26 of the first furniture assembly 24*a*, the interlock mechanism 32 can be retained in a locking state, such that the second objects 28 of the second furniture assembly 24*b* and the third furniture assembly 24*c* are prevented from being opened relative to the corresponding first objects 26 of the second furniture assembly 24*b* and the third furniture assembly 24*c*. In other words, the interlock mechanism 32 can achieve an interlock function for preventing the second drawer 22*b* and the third drawer 22*c* from being opened relative to the cabinet body 20 when the first drawer 22*a* is opened relative to the cabinet body 20.

Figure 3:
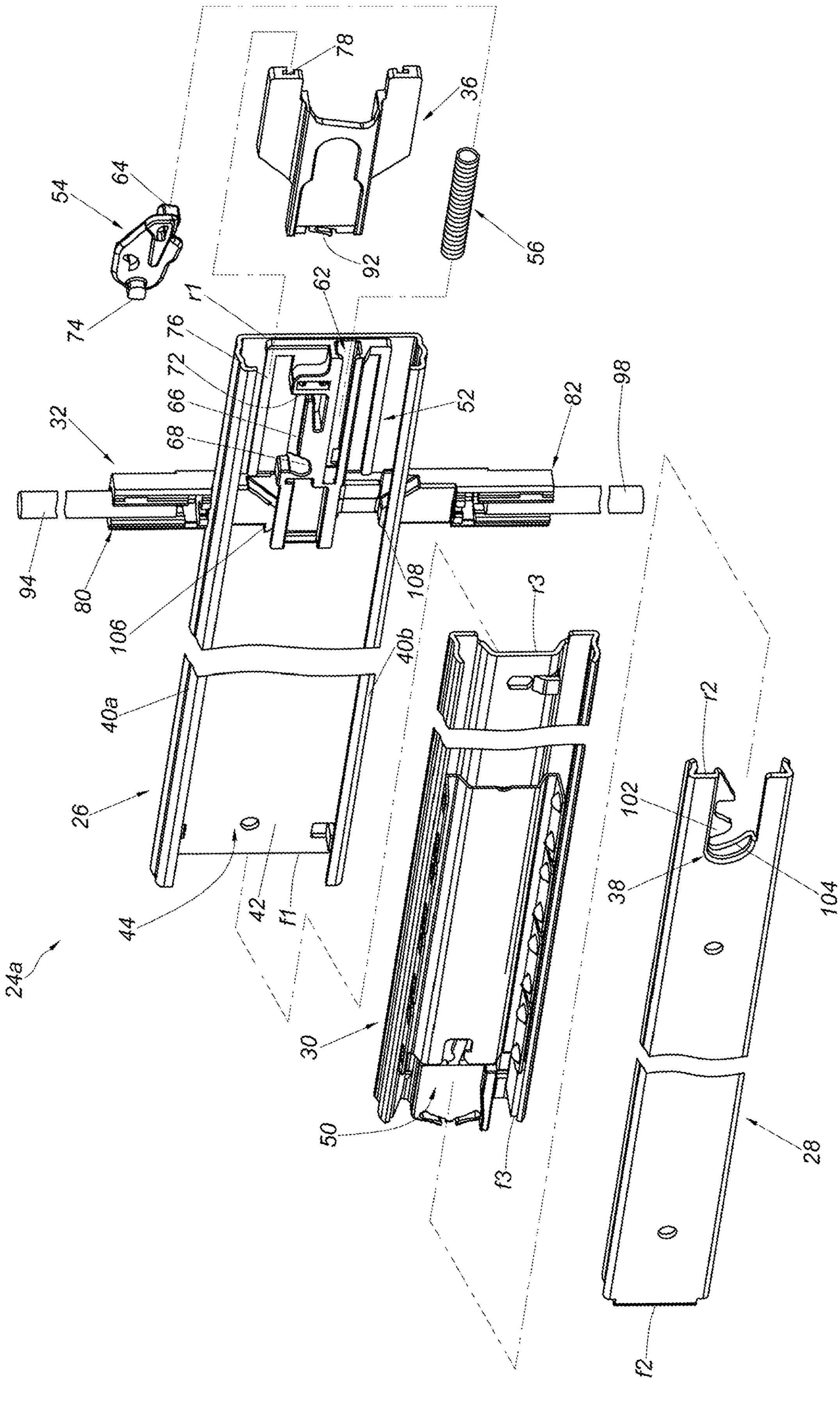
FIG. 3 is a partial exploded diagram of a first furniture assembly according to the first embodiment of the present invention.
Figure 4:
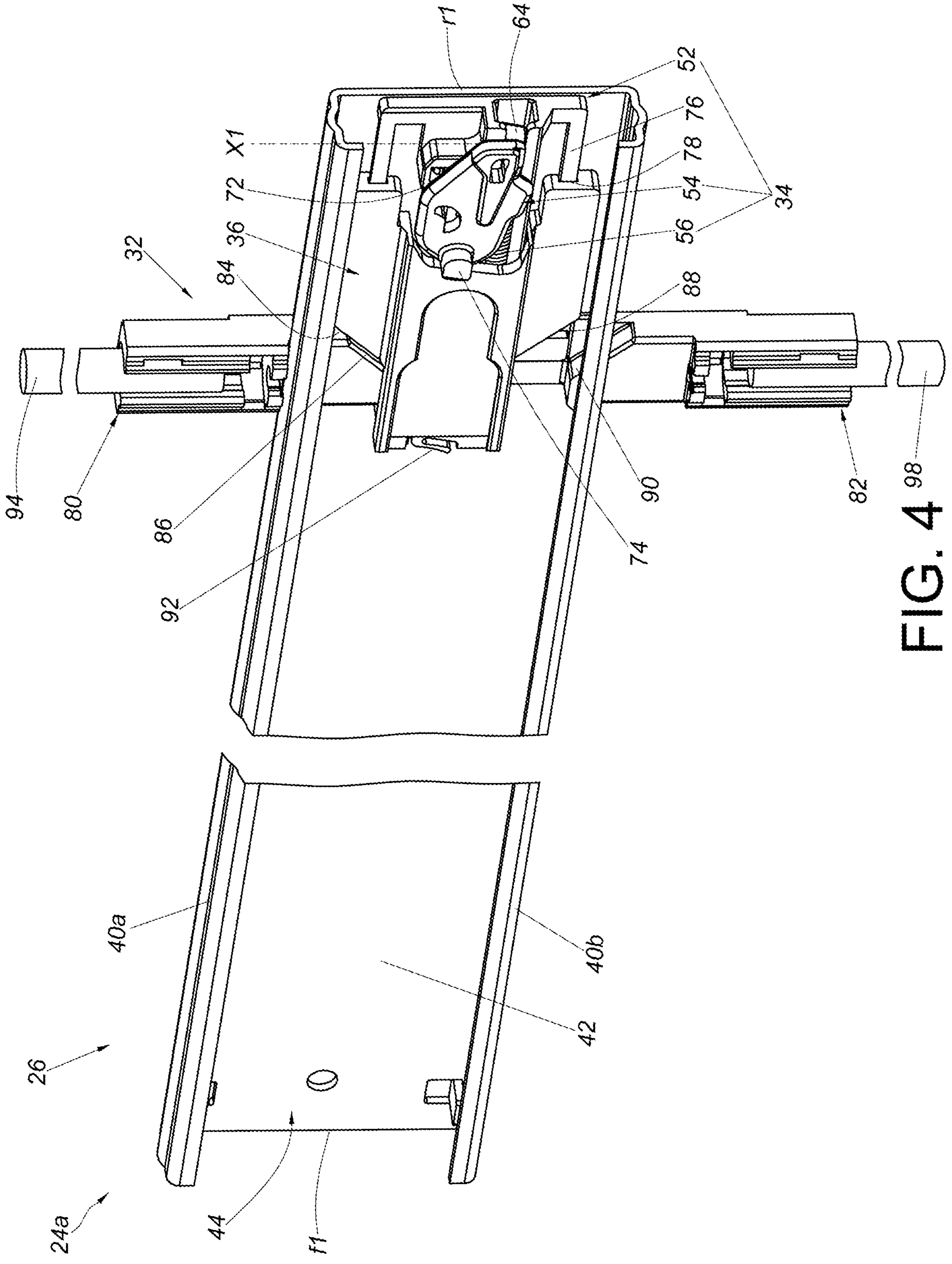
FIG. 4 is a partial assembling diagram of the first furniture assembly according to the first embodiment of the present invention.

Besides, as shown in FIG. 3 and FIG. 4, the first furniture assembly 24*a* further includes a self-closing device 34, an aiding member 36 and an actuating part 38.

As shown in FIG. 3 and FIG. 4, the first object 26 includes a first wall 40*a*, a second wall 40*b* and a longitudinal wall 42 connected between the first wall 40*a* and the second wall 40*b* of the first object 26. The first wall 40*a*, the second wall 40*b* and the longitudinal wall 42 of the first object 26 cooperatively define a first channel 44 of the first object 26. The first object 26 includes a front end portion f1 and a rear end portion r1.

The third object 30 is at least partially movably mounted inside the first channel 44 of the first object 26. The third object 30 includes a second channel 50. The third object 30 includes a front end portion f3 and a rear end portion r3.

The second object 28 is at least partially mounted inside the second channel 50 of the third object 30. The second object 28 includes a front end portion f2 and a rear end portion r2.

The self-closing device 34 is arranged on the first object 26. For example, the self-closing device 34 can be arranged adjacent to the rear end portion r1 of the first object 26. The self-closing device 34 includes a base 52, a working member 54 and a resilient member 56. The base 52 is detachably or fixedly connected to the longitudinal wall 42 of the first object 26. In this embodiment, by way of example, the base 52 can be fixedly connected to the longitudinal wall 42 of the first object 26. The working member 54 is movable relative to the base 52. The resilient member 56 is configured to drive the working member 54 to move back to an initial position X1 as shown in FIG. 4.

Preferably, the base 52 includes a receiving space 62. The resilient member 56 is detachably mounted inside the receiving space 62 of the base 52. The working member 54 includes a corresponding part 64 configured to abut against the resilient member 56. For example, the resilient member 56 can be a spring. The resilient member 56 can be detached from the receiving space 62 and replaced by another resilient member with an elastic coefficient different from an elastic coefficient of the resilient member 56 according to practical demands.

Figure 6:
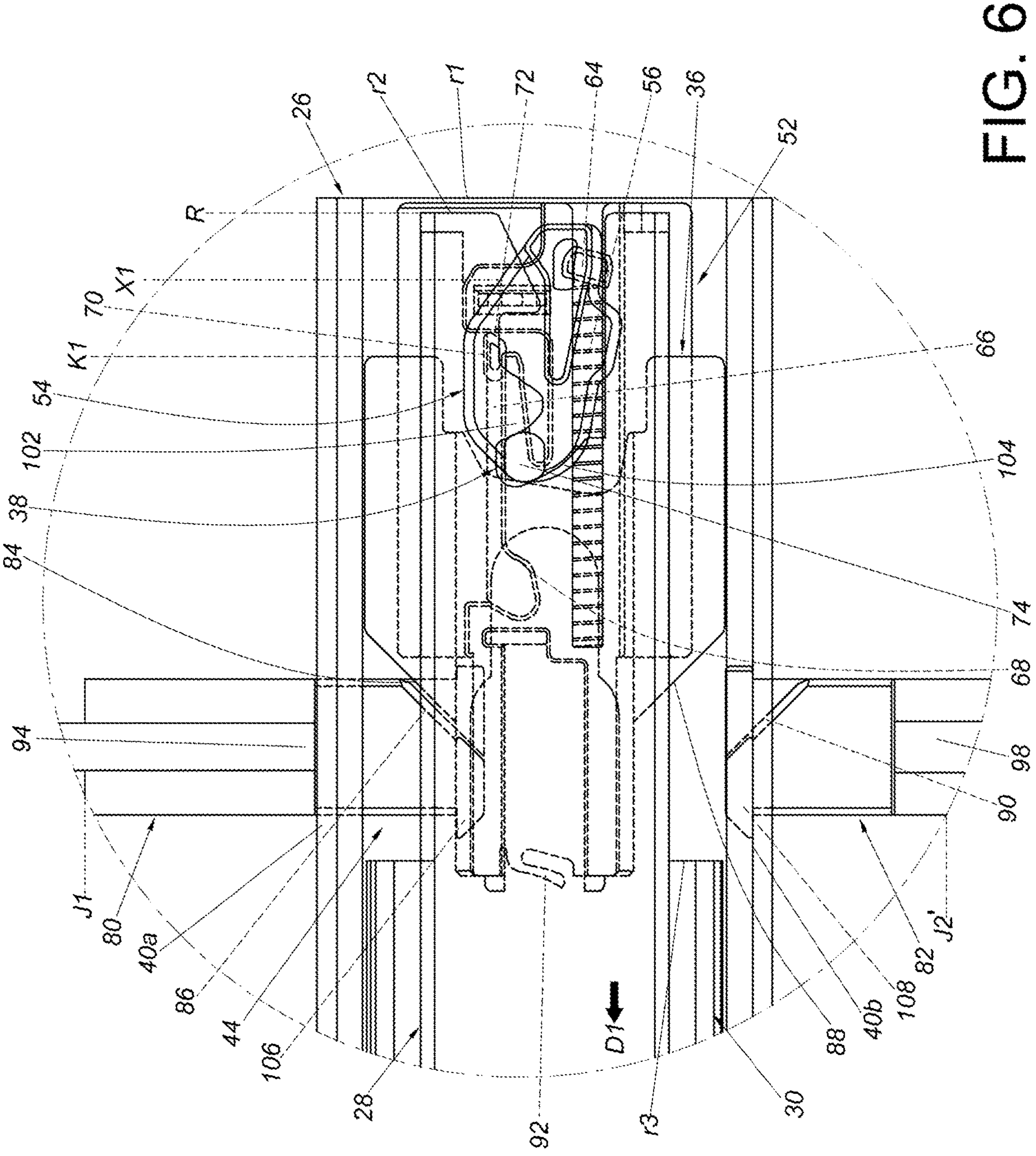
FIG. 6 is an enlarged diagram of an A portion of the first furniture assembly shown in FIG. 5 according to the first embodiment of the present invention.

Preferably, the working member 54 is movably mounted on the base 52. Furthermore, the base 52 further includes a longitudinal part 66 and a bending part 68. The longitudinal part 66 has a predetermined longitudinal length. The bending part 68 extends from the longitudinal part 66 and is bent from the longitudinal part 66. As shown in FIG. 6, the working member 54 includes a supporting feature 70, such that the working member 54 is movable along the longitudinal part 66 and the bending part 68 by the supporting feature 70. Besides, the base 52 further includes a blocking wall 72 configured to block the supporting feature 70 for stopping the working member 54 at a position, e.g., the initial position X1.

Preferably, the working member 54 further includes a working part 74 configured to cooperate with the actuating part 38. In this embodiment, by way of example, the working part 74 can be a protrusion. However, the present invention is not limited to this embodiment.

The aiding member 36 is movable relative to the base 52. In this embodiment, by way of example, the aiding member 36 can be movably mounted on the base 52. Preferably, the base 52 includes a longitudinal track 76, and the aiding member 36 includes a cooperating feature 78 movably mounted on the longitudinal track 76. In this embodiment, by way of example, the cooperating feature 78 can be configured to embrace the longitudinal track 76, such that the aiding member 36 is movable relative to the base 52 along the longitudinal track 76.

The interlock mechanism 32 is arranged on the first object 26. For example, the interlock mechanism 32 can be arranged adjacent to the rear end portion r1 of the first object 26. The interlock mechanism 32 includes at least one locking member, e.g., a first locking member 80 and a second locking member 82. The first locking member 80 and the second locking member 82 are movably mounted on the first object 26, and the first locking member 80 and the second locking member 82 are movable relative to the first wall 40*a* and the second wall 40*b* of the first object 26, respectively.

One of the aiding member 36 and the first locking member 80 includes a first guiding part 84. In this embodiment, by way of example, the aiding member 36 includes the first guiding part 84. Preferably, the first locking member 80 includes a first auxiliary guiding feature 86 configured to cooperate with the first guiding part 84. As shown in FIG. 4, in this embodiment, by way of example, the first guiding part 84 and the first auxiliary guiding feature 86 can be inclined surfaces or arc surfaces. However, the present invention is not limited to this embodiment. Similarly, one of the aiding member 36 and the second locking member 82 includes a second guiding part 88. In this embodiment, by way of example, the aiding member 36 includes the second guiding part 88. Preferably, the second locking member 82 includes a second auxiliary guiding feature 90 configured to cooperate with the second guiding part 88. As shown in FIG. 4, in this embodiment, by way of example, the second guiding part 88 and the second auxiliary guiding feature 90 can be inclined surfaces or arc surfaces. However, the present invention is not limited to this embodiment.

Preferably, the aiding member 36 further includes a buffering part 92. In this embodiment, by way of example, the buffering part 92 can be a resilient arm. However, the present invention is not limited to this embodiment.

Preferably, as shown in FIG. 2, the first locking member 80 of the first furniture assembly 24*a* is connected to a first rod 94 connected to a second locking member 96 of the second furniture assembly 24*b*. Besides, the second locking member 82 of the first furniture assembly 24*a* is connected to a second rod 98 connected to a first locking member 100 of the third furniture assembly 24*c*.

Preferably, in this embodiment, the actuating part 38 is arranged on the second object 28. For example, the actuating part 38 can be integrally connected to the second object 28 and located adjacent to the rear end portion r2 of the second object 28. Preferably, the actuating part 38 includes an engaging section 102 and a guiding section 104 adjacent to the engaging section 102. For example, the guiding section 104 can be an arc surface or an inclined surface.

Figure 5:
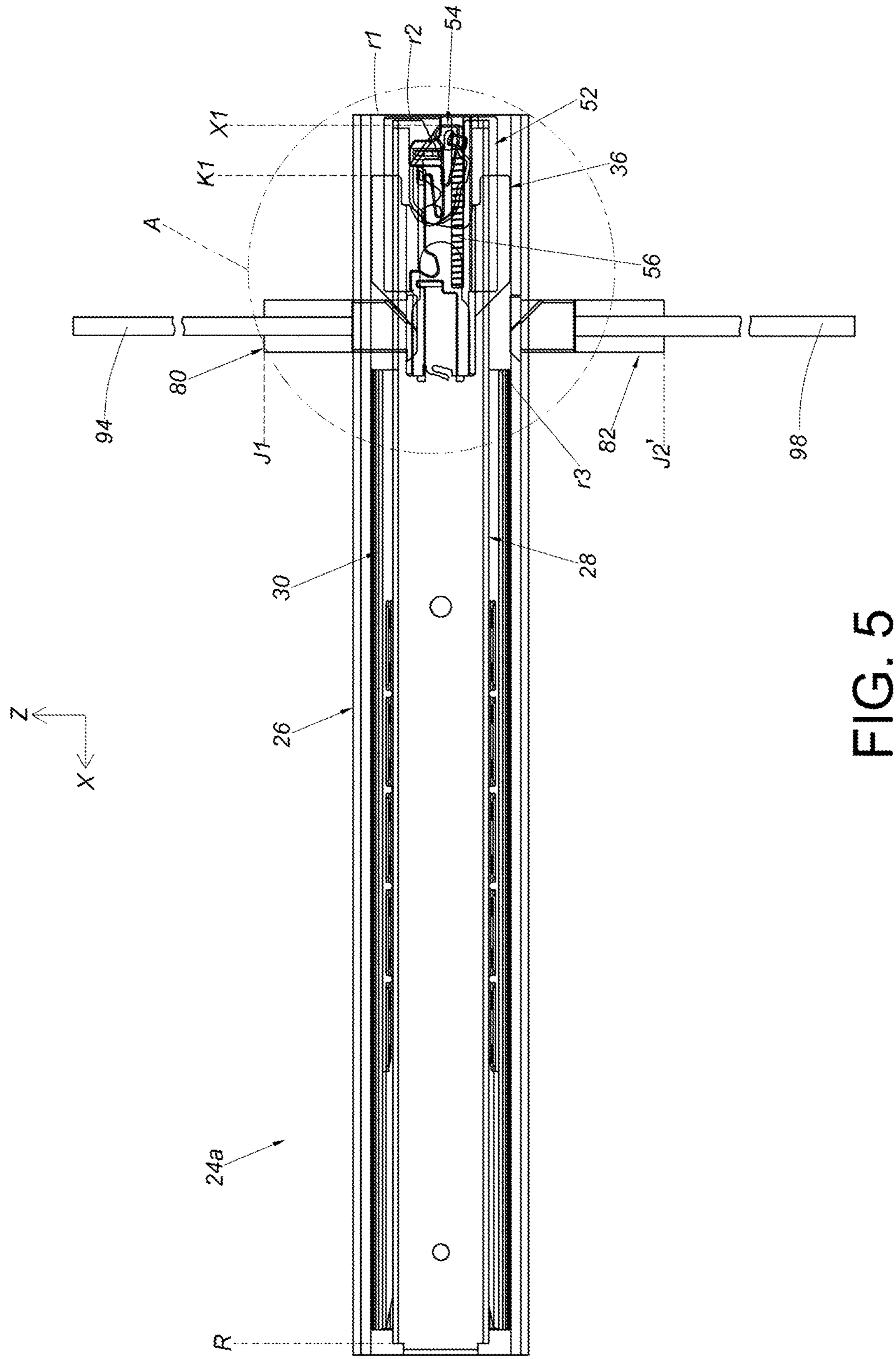
FIG. 5 is a diagram of the first furniture assembly as a second object is located at a retracted position relative to a first object according to the first embodiment of the present invention.

As shown in FIG. 5 and FIG. 6, the second object 28 is located at a retracted position R relative to the first object 26, and the actuating part 38 engages with the working member 54, e.g., the engaging section 102 of the actuating part 38 engages with the working part 74 of the working member 54. Besides, as shown in FIG. 5 and FIG. 6, the working member 54 is located at the initial position X1 relative to the base 52, and the aiding member 36 is located at a first predetermined position K1 relative to the base 52. In addition, as shown in FIG. 5 and FIG. 6, the first locking member 80 is located at an unlocking position J1 where the first auxiliary guiding feature 86 of the first locking member 80 is located at a position corresponding to the first guiding part 84 of the aiding member 36, and the second locking member 82 is located at a locking position J2' where the second auxiliary guiding feature 90 of the second locking member 82 is located at a position not corresponding to the second guiding part 88 of the aiding member 36, e.g., the second auxiliary guiding feature 90 of the second locking member 82 is misaligned with the second guiding part 88 of the aiding member 36.

Preferably, as shown in FIG. 5, a length of the first object 26 is substantially identical to a length of the second object 28, and a length of the third object 30 is less than the length of the first object 26 or the length of the second object 28. When the second object 28 is located at the retracted position R relative to the first object 26, the self-closing device 34 and the aiding member 36 are located between the rear end portion r3 of the third object 30 and the rear end portion r1 of the first object 26.

Preferably, as shown in FIG. 6, a portion of the first locking member 80 is located inside the first channel 44 of the first object 26, and the first locking member 80 includes a first restraining section 106 configured to abut against an inner side of the first wall 40*a* of the first object 26 for preventing an excessive movement of the first locking member 80. Similarly, a portion of the second locking member 82 is located inside the first channel 44 of the first object 26, and the second locking member 82 includes a second restraining section 108 configured to abut against an inner side of the second wall 40*b* of the first object 26 for preventing an excessive movement of the second locking member 82.

Preferably, the base 52 is configured to support the first locking member 80 for retaining the first locking member 80 at the unlocking position J1. Besides, the second restraining section 108 of the second locking member 82 and the inner side of the second wall 40*b* of the first object 26 are configured to abut against each other for retaining the second locking member 82 at the locking position J2'.

Figure 7:
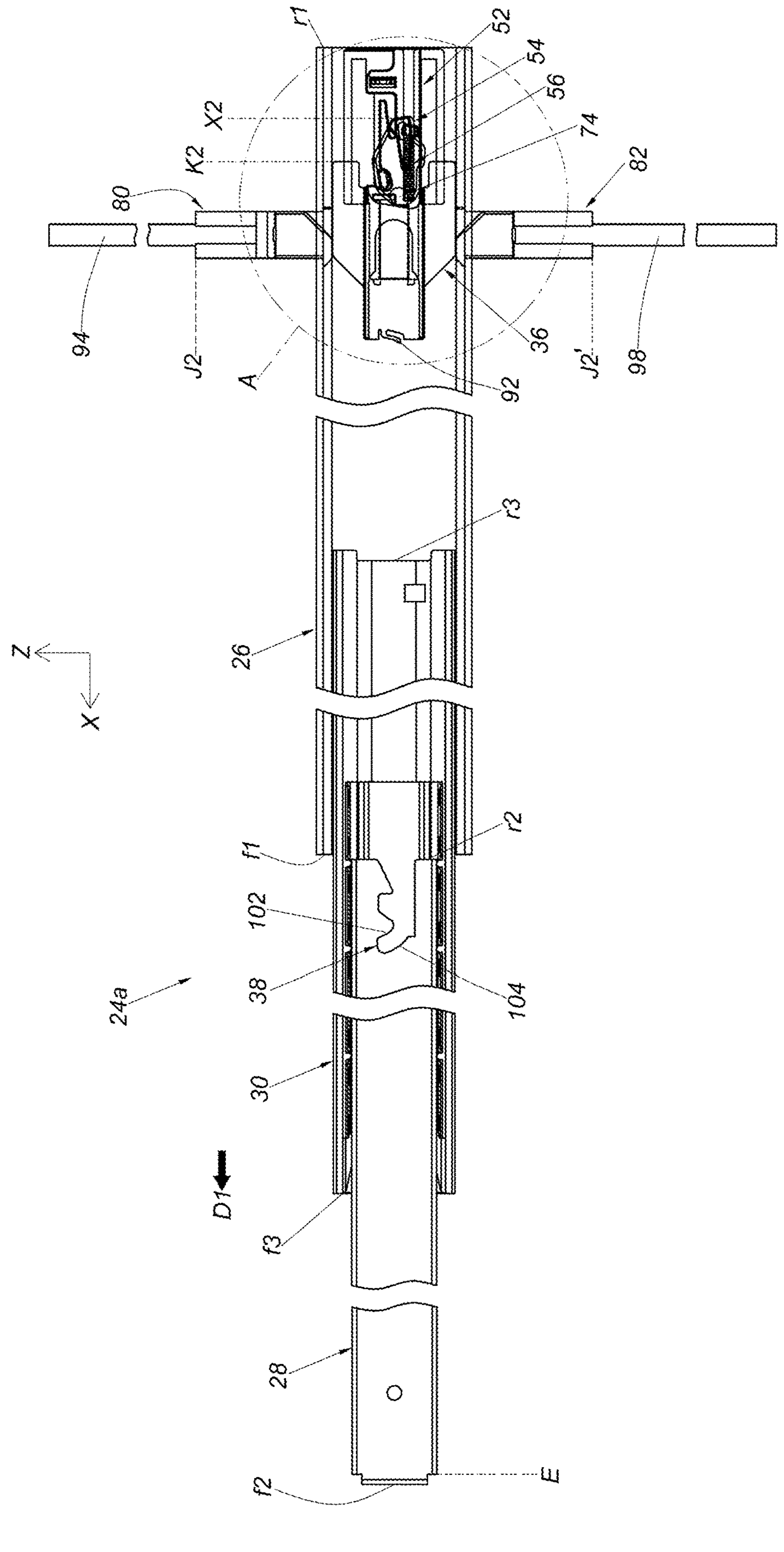
FIG. 7 is a diagram of the first furniture assembly as the second object is located at an extended position and a working member is located at an engaging position according to the first embodiment of the present invention.
Figure 8:
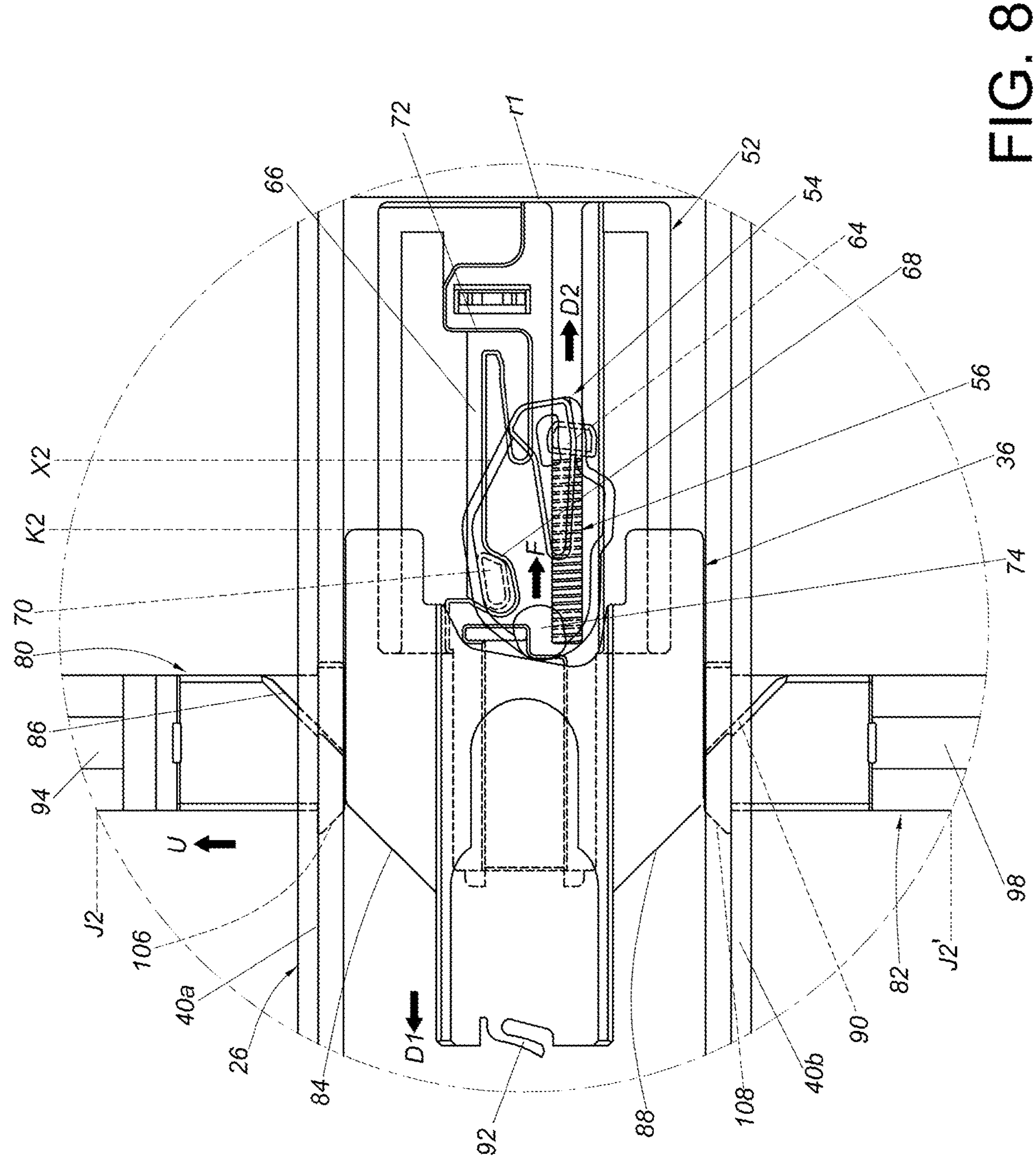
FIG. 8 is an enlarged diagram of a B portion of the first furniture assembly shown in FIG. 7 according to the first embodiment of the present invention.

When the second object 28 is displaced relative to the first object 26 from the retracted position R toward an extended position E along an opening direction D1, the actuating part 38 drives the working member 54 to move from the initial position X1 as shown in FIG. 6 to an engaging position X2 as shown in FIG. 7 and FIG. 8. For example, when the working member 54 is located at the engaging position X2 as shown in FIG. 8, the supporting feature 70 of the working member 54 engages with the bending part 68 of the base 52, and the working member 54 is tilted. Besides, when the actuating part 38 drives the working member 54 to move from the initial position X1 as shown in FIG. 6 to the engaging position X2 as shown in FIG. 7 and FIG. 8, the resilient member 56 is resiliently deformed to generate a self-closing resilient force F as shown in FIG. 8 along a retracting direction D2 and the aiding member 36 is driven to move from the first predetermined position K1 as shown in FIG. 6 to a second predetermined position K2 as shown in FIG. 7 and FIG. 8. During a movement of the aiding member 36 from the first predetermined position K1 to the second predetermined position K2, the aiding member 36 drives the first locking member 80 to move from the unlocking position J1 as shown in FIG. 6 to a locking position J2 as shown in FIG. 7 and FIG. 8 along the vertical direction, e.g., a height direction U, by an abutment of the first guiding part 84 and the first auxiliary guiding feature 86.

As shown in FIG. 8, when the aiding member 36 is located at the second predetermined position K2, the aiding member 36 can support the first locking member 80 for retaining the first locking member 80 at the locking position J2. Moreover, as shown in FIG. 8, when the aiding member 36 is located at the second predetermined position K2, the aiding member 36 can press the second locking member 82 for retaining the second locking member 82 at the locking position J2'. In addition, as shown in FIG. 7 and FIG. 8, during a movement of the working member 54 from the initial position X1 to the engaging position X2, the working part 74 of the working member 54 moves along the guiding section 104 of the actuating part 38 to disengage from the engaging section 102 of the actuating part 38.

Preferably, when the second object 28 is displaced from the retracted position R toward the extended position E along the opening direction D1, the working member 54 is driven by the actuating part 38, so as to drive the aiding member 36 to move from the first predetermined position K1 as shown in FIG. 6 to the second predetermined position K2 as shown in FIG. 8 along the opening direction D1 by the working member 54.

Figure 9:
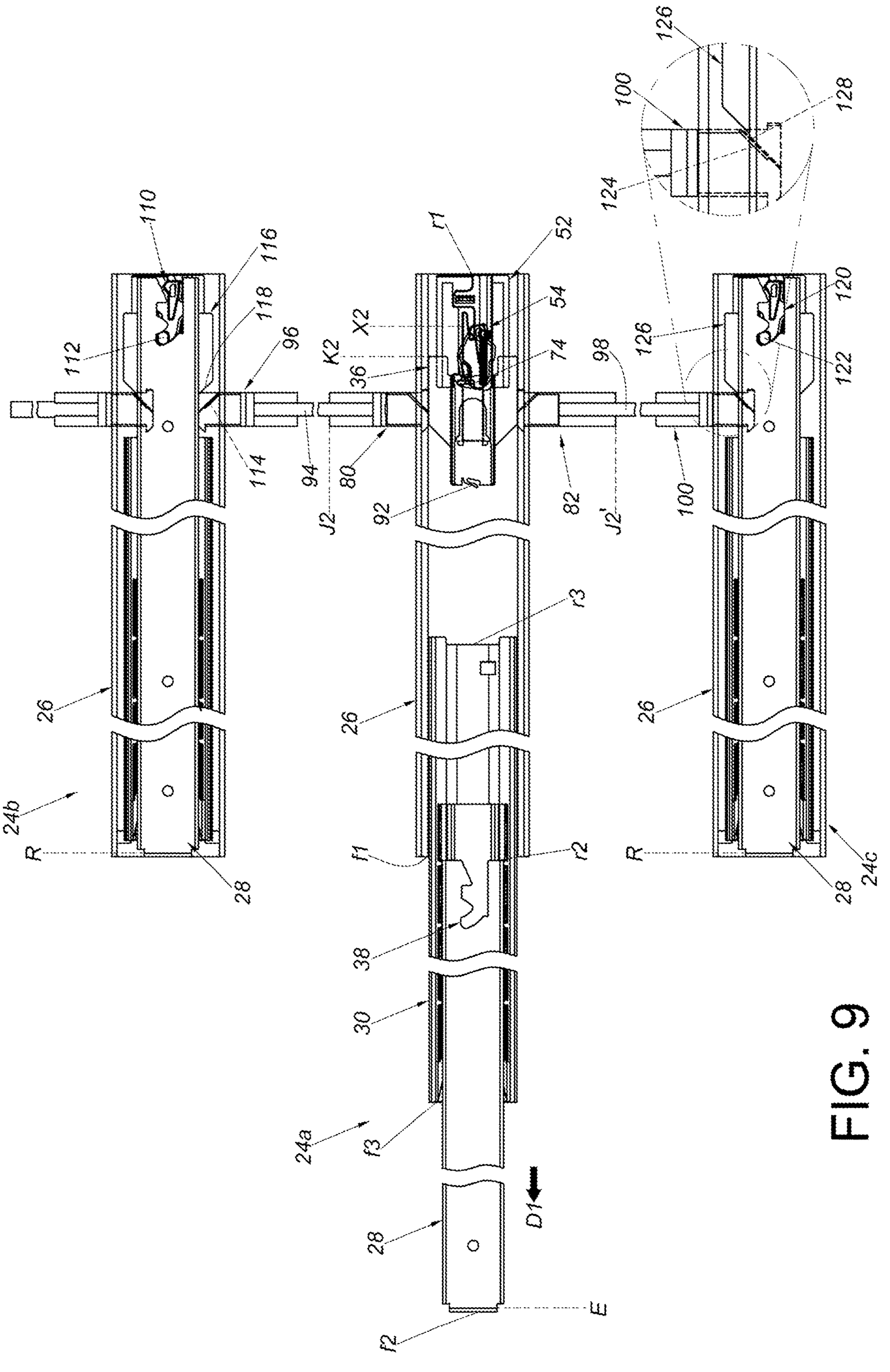
FIG. 9 is a diagram illustrating the first furniture assembly locks a second furniture assembly and a third furniture assembly according to the first embodiment of the present invention.

As shown in FIG. 9, when the second object 28 of the first furniture assembly 24*a* is located at the extended position E relative to the corresponding first object 26 and the aiding member 36 is located at the second predetermined position K2, the aiding member 36 retains the first locking member 80 and the second locking member 82 at the locking positions J2, J2' respectively for preventing opening movements of the other second objects 28, e.g., the second objects 28 of the second furniture assembly 24*b* and the third furniture assembly 24*c*, relative to the corresponding first objects 26 along the opening direction D1, so as to prevent the corresponding drawers, e.g., the second drawer 22*b* and the third drawer 22*c*, from being opened relative to the cabinet body 20.

Furthermore, two ends of the first rod 94 are connected to the first locking member 80 of the first furniture assembly 24*a* and the second locking member 96 of the second furniture assembly 24*b*, respectively. When the second object 28 of the second furniture assembly 24*b* is located at the retracted position R relative to the corresponding first object 26, an actuating part arranged on the second object 28 of the second furniture assembly 24*b* engages with a working member 110, e.g., a working part 112 of the working member 110 of the second furniture assembly 24*b*. When the first locking member 80 of the first furniture assembly 24*a* is retained at the locking position J2, a second auxiliary guiding feature 114 of the second locking member 96 of the second furniture assembly 24*b* can block a second guiding part 118 of an aiding member 116 of the second furniture assembly 24*b* to prevent the aiding member 116 of the second furniture assembly 24*b* from moving along the opening direction D1, so as to prevent the second object 28 of the second furniture assembly 24*b* from being opened relative to the corresponding first object 26 along the opening direction D1.

Similarly, two ends of the second rod 98 are connected to the second locking member 82 of the first furniture assembly 24*a* and the first locking member 100 of the third furniture assembly 24*c*, respectively. When the second object 28 of the third furniture assembly 24*c* is located at the retracted position R relative to the corresponding first object 26, an actuating part arranged on the second object 28 of the third furniture assembly 24*c* engages with a working member 120, e.g., a working part 122 of the working member 120 of the third furniture assembly 24*c*. When the second locking member 82 of the first furniture assembly 24*a* is retained at the locking position J2', a first auxiliary guiding feature 124 of the first locking member 100 of the third furniture assembly 24*c* can block a first guiding part 128 of an aiding member 126 of the third furniture assembly 24*c* to prevent the aiding member 126 of the third furniture assembly 24*c* from moving along the opening direction D1, so as to prevent the second object 28 of the third furniture assembly 24*c* from being opened relative to the corresponding first object 26 along the opening direction D1.

From the above, understandably, when the second object 28 of the first furniture 24*a*, is opened relative to the corresponding first object 26, the aiding member 36 in the second predetermined position K2 retains the interlock mechanism 32 in the locking state to achieve the interlock function for preventing the second objects 28 of the second furniture assembly 24*b* and the third furniture assembly 24*c* from being opened relative to the corresponding first objects 26.

Figure 10:
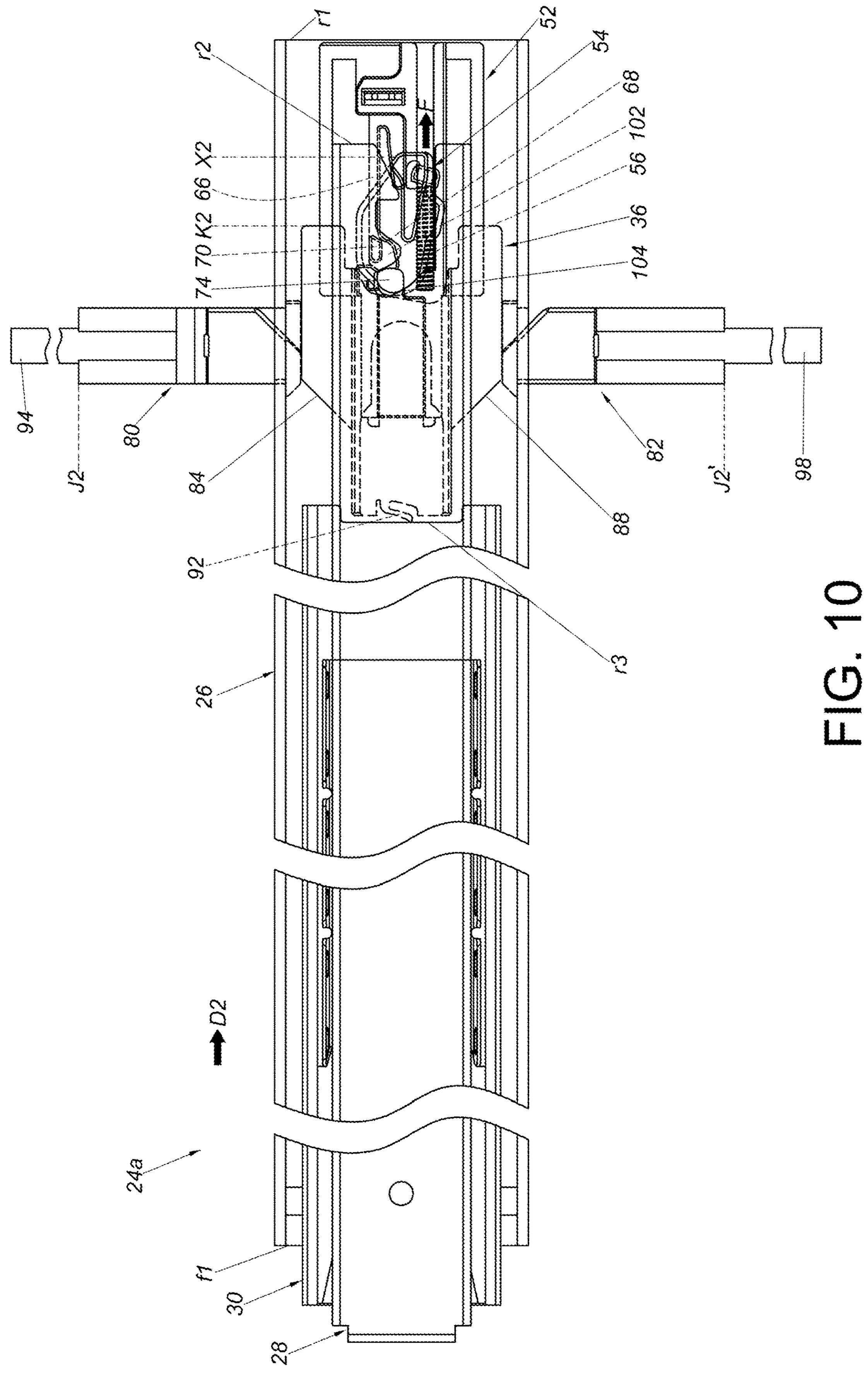
FIG. 10 is a diagram of the first furniture assembly as the second object is displaced along a retracting direction to drive the working member to move from the engaging position according to the first embodiment of the present invention.

When it is desired to terminate the interlock function, it has to move the aiding member 36 from the second predetermined position K2 as shown in FIG. 10 back to the first predetermined position K1 as shown in FIG. 5 and FIG. 6. Furthermore, the aiding member 36 can be driven to move from the second predetermined position K2 as shown in FIG. 10 to the first predetermined position K1 as shown in FIG. 5 and FIG. 6 during a displacement of the second object 28 of the first furniture assembly 24*a* relative to the corresponding first object 26 from the extended position E toward the retracted position R along the retracting direction D2. As shown in FIG. 5 and FIG. 6, when the aiding member 36 is located at the first predetermined position K1, the aiding member 36 does not support the first locking member 80, such that the first locking member 80 can return back to the unlocking position J1. Besides, as shown in FIG. 5 and FIG. 6, when the aiding member 36 is located at the first predetermined position K1, the aiding member 36 does not press the second locking member 82 for allowing the second locking member 82 to move from the locking position J2'. In other words, when the aiding member 36 is located at the first predetermined position K1, the interlock function is terminated. Besides, during the displacement of the second object 28 of the first furniture assembly 24*a* relative to the corresponding first object 26 from the extended position E toward the retracted position R along the retracting direction D2, the actuating part 38 arranged on the second object 28 of the first furniture assembly 24*a* engages with the working member 54 again. For example, during the displacement of the second object 28 of the first furniture assembly 24*a* relative to the corresponding first object 26 from the extended position E toward the retracted position R along the retracting direction D2, the working part 74 of the working member 54 can be driven to move along the guiding section 104 of the actuating part 38 to engage with the engage section 102 of the actuating part 38, so as to drive the working member 54 to move from the engaging position X2 to disengage the supporting feature 70 of the working member 54 from the bending part 68 of the base 52. In such a way, the working member 54 can move back to the initial position X1 in response to the self-closing resilient force F provided by the resilient member 56 along the retracting direction D2 for driving the second object 28 of the first furniture assembly 24*a* back to the retracted position R as shown in FIG. 5 and FIG. 6, so as to achieve a self-closing function.

Preferably, during the displacement of the second object 28 of the first furniture assembly 24*a* from the extended position E toward the retracted position R along the retracting direction D2, the third object 30 of the first furniture assembly 24*a* is displaced along the retracting direction D2 as shown in FIG. 10. The third object 30 of the first furniture assembly 24*a* can drive the aiding member 36 from the second predetermined position K2 as shown in FIG. 10 back to the first predetermined position K1 as shown in FIG. 5 and FIG. 6. For example, the rear end portion r3 of the third object 30 of the first furniture assembly 24*a* can abut against the buffering part 92 of the aiding member 36, such that the third object 30 of the first furniture assembly 24*a* drives the aiding member 36 from the second predetermined position K2 as shown in FIG. 10 back to the first predetermined position K1 as shown in FIG. 5 and FIG. 6 by an abutment of the rear end portion r3 of the third object 30 and the buffering part 92 of the aiding member 36 of the first furniture assembly 24*a* during a movement of the working member 54 back to the initial position X1 in response to the self-closing resilient force F provided by the resilient member 56 along the retracting direction D2 for driving the second object 28 of the first furniture assembly 24*a* back to the retracted position R as shown in FIG. 5 and FIG. 6. Understandably, in another embodiment, the second object can be configured to abut against the aiding member to drive the aiding member back to the first predetermined position.

Figure 11:
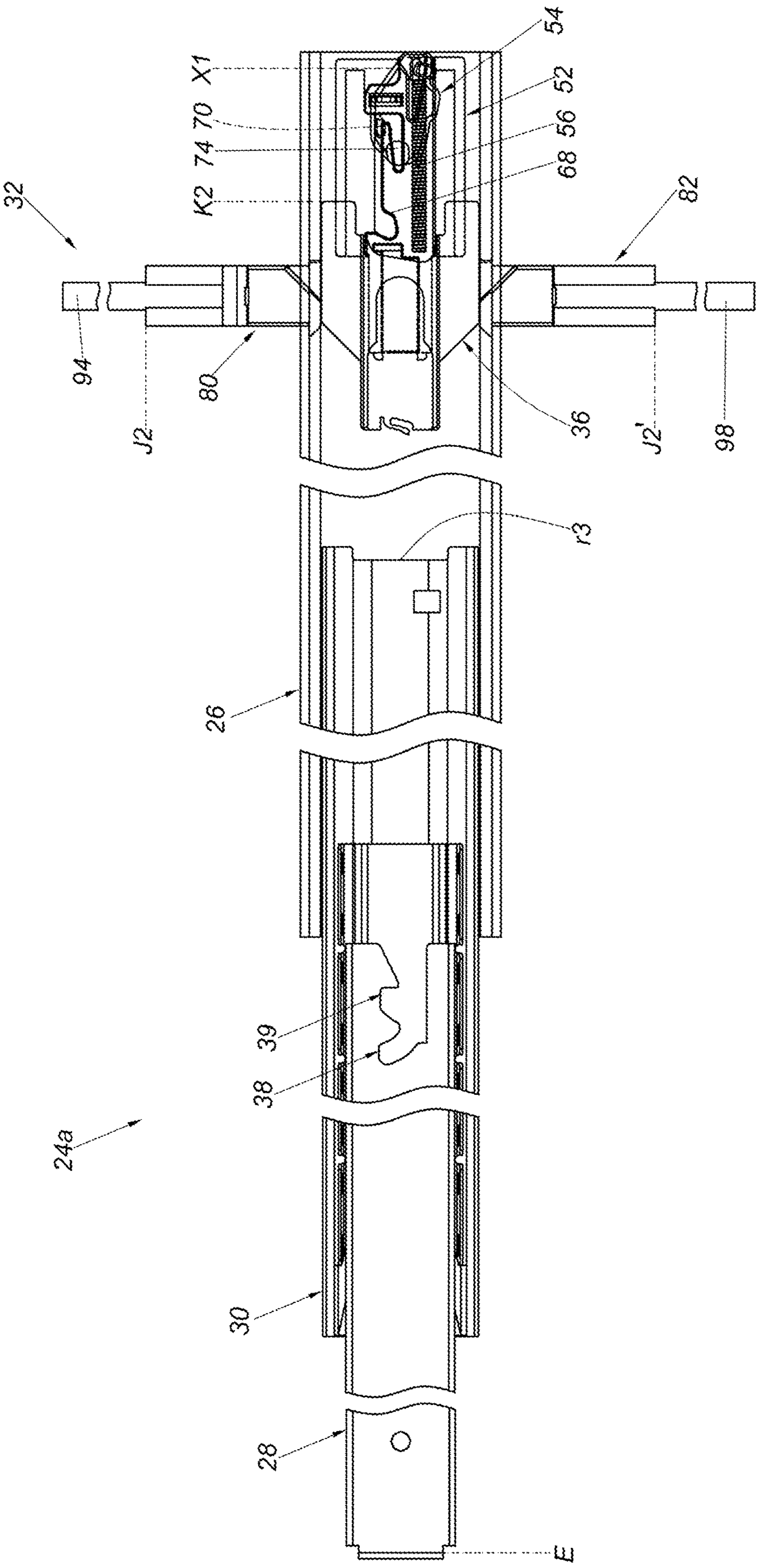
FIG. 11 is a diagram of the first furniture assembly as the second object is located at the extended position and the working member is located at an initial position according to the first embodiment of the present invention.

As shown in FIG. 11, if the second object 28 of the first furniture assembly 24*a* is located at the extended position E relative to the corresponding first object 26 and the supporting feature 70 of the working member 54 is driven to disengage from the bending part 68 by an unexpected force, e.g., due to a collision or a vibration, the working member 54 moves back to the initial position X1 along the retracting direction D2 in response to the self-closing resilient force F provided by the resilient member 56, which causes malfunction of the self-closing device 34. However, when the working member 54 moves back to the initial position X1, since the aiding member 36 is still located at the second predetermined position K2 for retaining the first locking member 80 and the second locking member 82 at the locking positions J2, J2', the interlock mechanism 32 still can achieve the interlock function. When it is desired to terminate the interlock function, the aiding member 36 can be moved from the second predetermined position K2 as shown in FIG. 11 to the first predetermined position K1 by the displacement of the second object 28 of the first furniture assembly 24*a* from the extended position E toward the retracted position R along the retracting direction D2.

When the malfunction of the self-closing device 34 occurs, another actuating part 39 arranged on the second object 28 of the first furniture assembly 24*a* can be utilized to engage with the working part 74 of the working member 54 for driving the working member 54 from the initial position X1 to the engaging position X2 along the opening direction D1, so as to achieve a functional recovery of the self-closing device 34.

Figure 12:
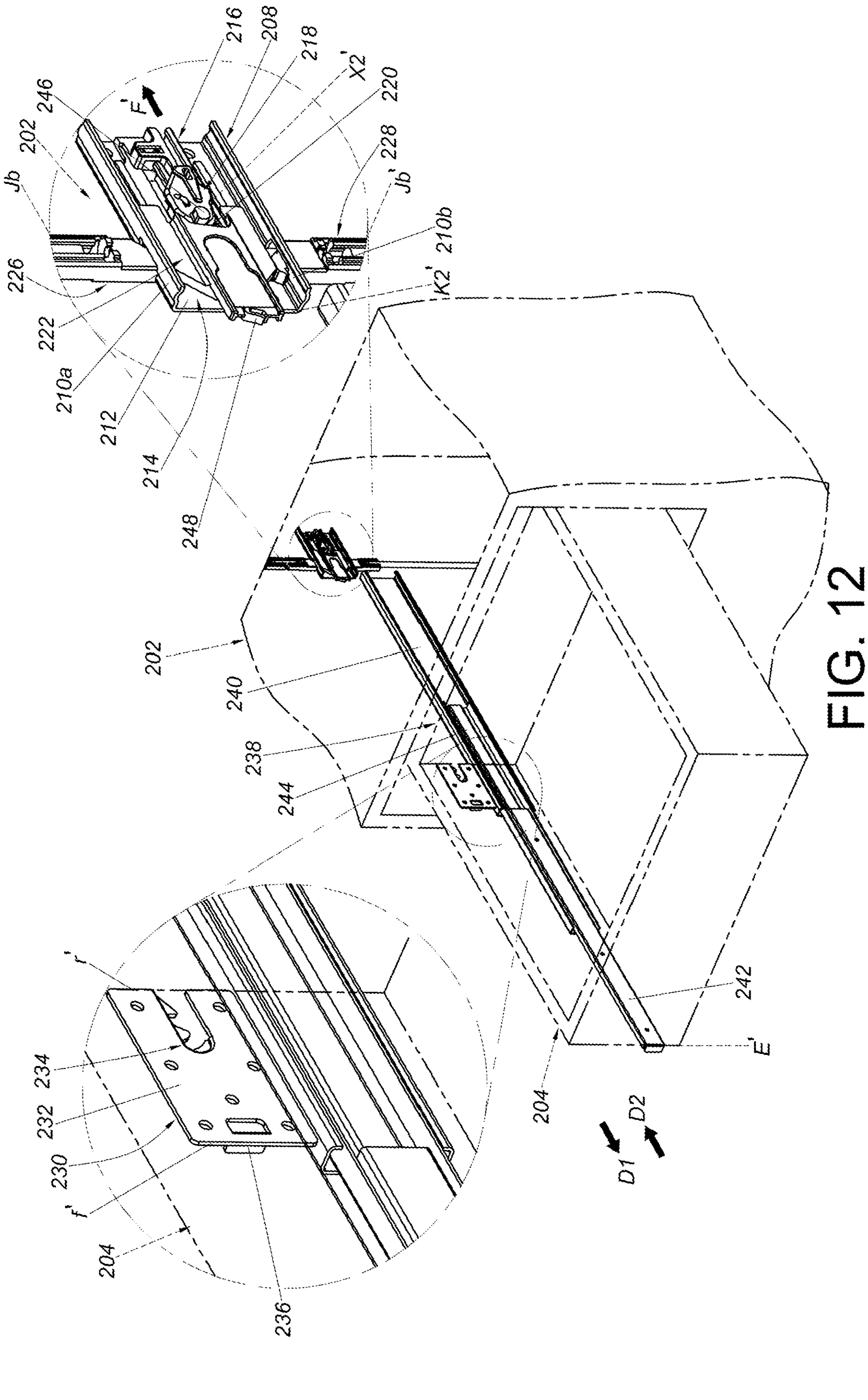
FIG. 12 is a partial diagram of a furniture assembly as a second object is located at an extended position and a working member is located at an engaging position according to a second embodiment of the present invention.

As shown in FIG. 12, different from the first embodiment, a furniture assembly of the second embodiment includes a first object 202 and a second object 204, wherein the furniture assembly can be a cabinet system, and the first object 202 and the second object 204 can be a cabinet body and a drawer of the cabinet system, respectively.

Furthermore, the furniture assembly of the second embodiment further includes a first fitting member 208, and a self-closing device is arranged on the first object 202 by the first fitting member 208. In this embodiment, by way of example, the first fitting member 208 can be detachably connected to the first object 202. However, the present invention is not limited to this embodiment. Understandably, the first fitting member 208 can be considered as a part of the first object 202 because of connection of the first fitting member 208 and the first object 202. The first fitting member 208 includes a first wall 210*a*, a second wall 210*b* and a longitudinal wall 212 connected between the first wall 210*a* and the second wall 210*b* of the first fitting member 208, and the first wall 210*a*, the second wall 210*b* and the longitudinal wall 212 of the first fitting member 208 cooperatively define an auxiliary channel 214 of the first fitting member 208.

The self-closing device includes a base 216, a working member 218 and a resilient member 220, and an aiding member 222. The base 216 is connected to the longitudinal wall 212 of the first fitting member 208. The working member 218 and the aiding member 222 are movable relative to the base 216. Other details of the base 216, the working member 218, the resilient member 220 and the aiding member 222 of this embodiment are identical to the ones of the base 52, the working member 54, the resilient member 56 and the aiding member 36 of the first embodiment. Detailed description is omitted herein for simplicity.

Furthermore, an interlock mechanism is arranged on the first object 202 by the first fitting member 208. The interlock mechanism includes at least one locking member, e.g., a first locking member 226 and a second locking member 228. The first locking member 226 and the second locking member 228 are movably mounted on the first fitting member 208. The first locking member 226 and the second locking member 228 are movable relative to the first wall 210*a* and the second wall 210*b* of the first fitting member 208, respectively.

Besides, the furniture assembly of the second embodiment further includes a second fitting member 230 mounted on the second object 204. In this embodiment, the second fitting member 230 can be detachably connected to the second object 204. However, the present invention is not limited to this embodiment. Understandably, the second fitting member 230 can be considered as a part of the second object 204 because of connection of the second fitting member 230 and the second object 204. The second fitting member 230 includes a main body part 232, an actuating part 234 and a predetermined part 236. The main body part 232 includes a front end portion f' and a rear end portion r'. The actuating part 234 is arranged on the main body part 232 and located adjacent to the rear end portion r' of the main body part 232. The predetermined part 236 is bent from the front end portion f' of the main body part 232. In this embodiment, by way of example, the predetermined part 234 can be bent from the front end portion f' of the main body part 232 and is substantially perpendicular to the front end portion f' of the main body part 232. From the above, understandably, the actuating part 234 can be considered to be detachably arranged on the second object 204 by the second fitting member 230. Other details of the actuating part 234 of this embodiment are identical to the ones of the actuating part 38 of the first embodiment. Detailed description is omitted herein for simplicity.

Preferably, the furniture assembly of the second embodiment further includes an auxiliary supporting device 238. The auxiliary supporting device 238 includes a first auxiliary rail 240 and a second auxiliary rail 242 displaceable relative to the first auxiliary rail 240 along the longitudinal direction. The first auxiliary rail 240 is mounted on the first object 202, and the second auxiliary rail 242 is configured to support the second object 204.

Preferably, the auxiliary supporting device 238 further includes a third auxiliary rail 244 movably mounted between the first auxiliary rail 240 and the second auxiliary rail 242 for extending a displacement of the second auxiliary rail 242 relative to the first auxiliary rail 240. In other words, in this embodiment, by way of example, the auxiliary supporting device 238 can be a three-section slide rail assembly.

Similar to the first embodiment, in this embodiment, when the second object 204 is displaced from the retracted position toward an extended position E' along the opening direction D1, the actuating part 234 drives the working member 218 to move from an initial position X1' to an engaging position X2', such that the resilient member 220 is resiliently deformed to generate a self-closing resilient force F' along the retracting direction D2 and the aiding member 222 is driven to move from a first predetermined position K1' to a second predetermined position K2'. When the second object 204 is located at the extended position E' relative to the first object 202, the aiding member 222 located at the second predetermined position K2' retains the first locking member 226 and the second locking member 28 at the locking positions Jb, Jb' respectively for preventing opening movements of second objects of other furniture assemblies relative to corresponding first objects.

Figure 13:
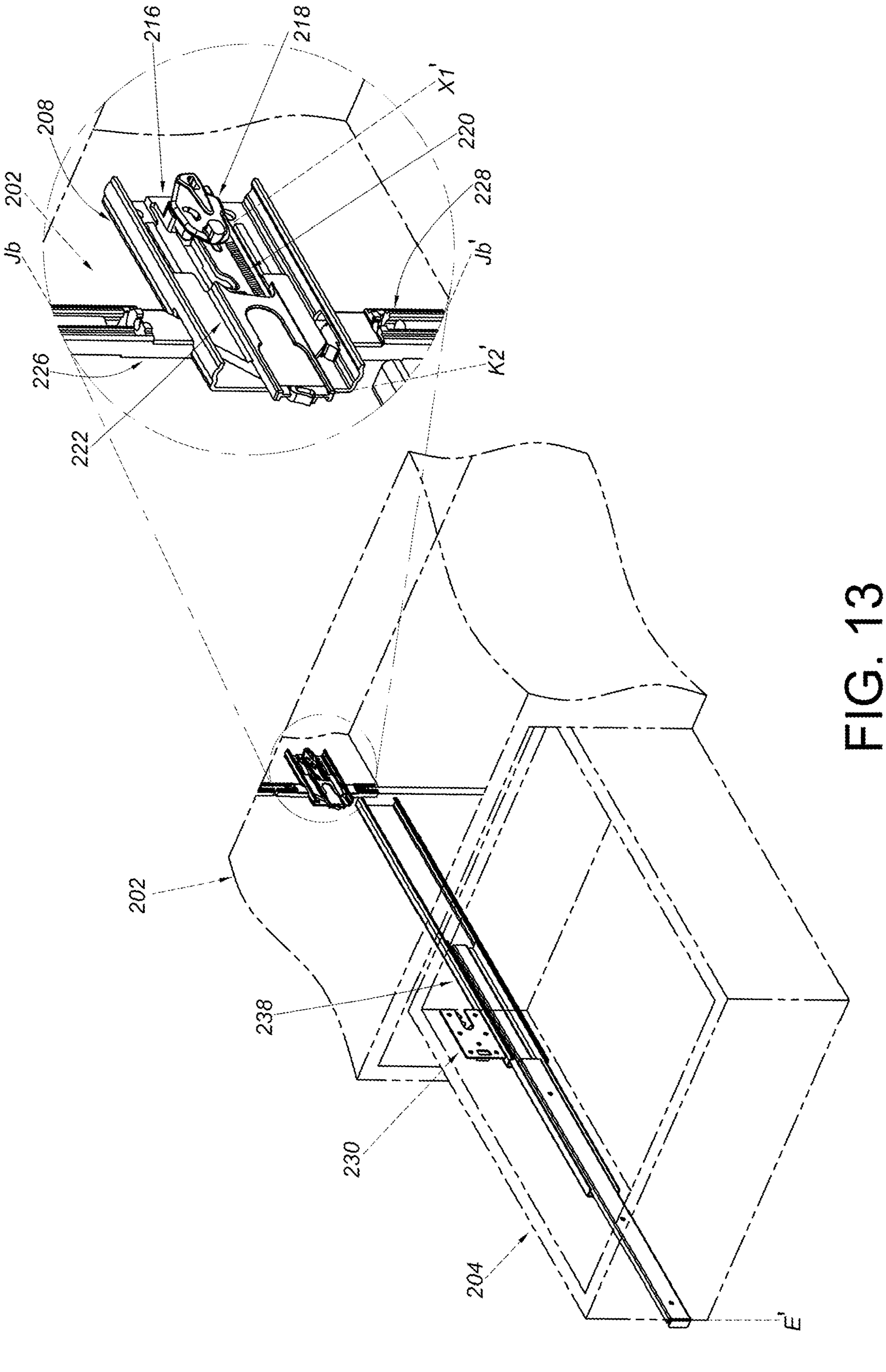
FIG. 13 is a partial diagram of the furniture assembly as the second object is located at the extended position and the working member is located at an initial position according to the second embodiment of the present invention.

As shown in FIG. 13 and FIG. 12, similar to the first embodiment, in this embodiment, if the second object 204 is located at the extended position E' and the working member 218 disengages from the base 216 by an unexpected force, e.g., due to a collision or a vibration, and then moves back to the initial position X1' along the retracting direction D2 in response to the self-closing resilient force F provided by the resilient member 220, the aiding member 222 is still located at the second predetermined position K2' for retaining the first locking member 226 and the second locking member 228 at the locking positions Jb, Jb', so as to prevent a malfunction of the interlock mechanism.

Figure 14:
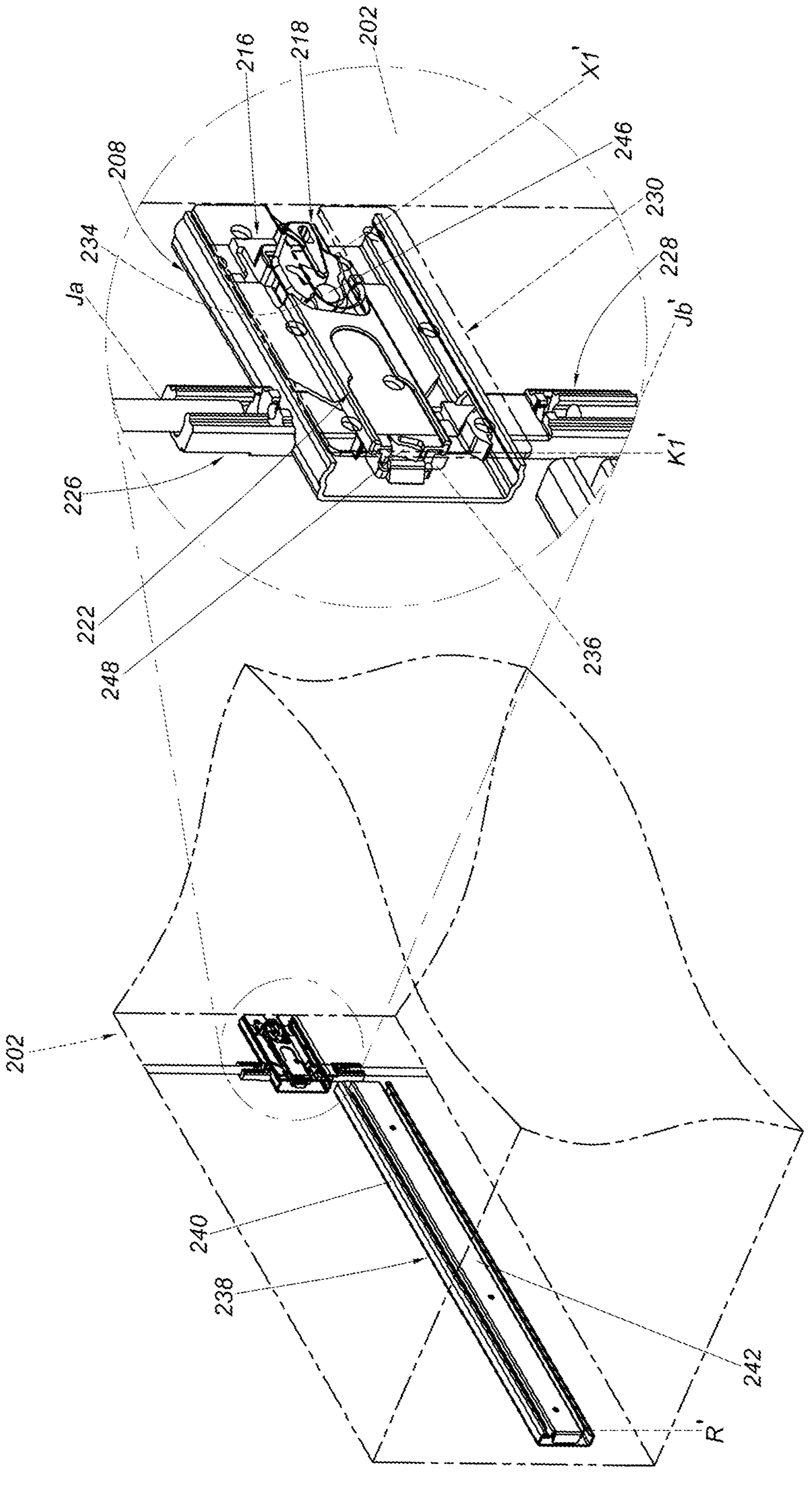
FIG. 14 is a partial diagram of the furniture assembly as the second object is located at a retracted position and the working member is located at the initial position as according to the second embodiment of the present invention.

As shown in FIG. 14, FIG. 14 illustrates the second fitting member 230 and the second auxiliary rail 242 but does not illustrate the second object 204. As shown in FIG. 12 and FIG. 12, similar to the first embodiment, in this embodiment, during a displacement of the second object 204 from the extended position E' toward the retracted position R' along the retracting direction D2, the actuating part 234 of the second fitting member 230 engages with the working part of the working member 218, such that the working member 218 can move from the engaging position X2' as shown in FIG. 12 to the initial position X1' as shown in FIG. 14 in response to the self-closing resilient force F' for driving the second object 204 to move back to the retracted position R' as shown in FIG. 14. Furthermore, during the displacement of the second object 204 from the extended position E' toward the retracted position R' along the retracting direction D2, the predetermined part 236 of the second fitting member 230 can abut against the buffering part 248 of the aiding member 222 to drive the aiding member 222 to move from the second predetermined position K2' as shown in FIG. 12 to the first predetermined position K1' as shown in FIG. 14, such that the aiding member 222 does not support the first locking member 226 for returning the first locking member 226 from the locking position Jb as shown in FIG. 12 to an unlocking position Ja as shown in FIG. 14 and the aiding member 222 does not press the second locking member 228 for allowing the second locking member 228 to move from the locking position Jb', so as to terminate the interlock function.

In conclusion, in contrast to the prior art, the present invention includes the following characteristics.

1. If the second object 28, 204 is located at the extended position E, E' relative to the first object 26, 202 and the working member 54, 218 disengages from the base 52, 216 by an unexpected force, e.g., due to a collision or a vibration, and then moves back to the initial position X1, X1' along the retracting direction D2 in response to the self-closing resilient force F, F', the aiding member 36, 222 is still located at the second predetermined position K2, K2' for retaining the first locking member 80, 226 and the second locking member 82, 228 at the locking positions, so as to prevent a malfunction of the interlock mechanism.

2. In the first embodiment, the self-closing device 34 and the at least one locking member of the interlock mechanism 32 are mounted on the first object 26, e.g., the fixed rail. In other words, in the first embodiment, the self-closing device 34 and the interlock mechanism are built together with the slide rail assembly. In the second embodiment, the self-closing device and the at least one locking member of the interlock mechanism are detachably mounted on the first object 202, e.g., the cabinet body, by the first fitting member 208, and the self-closing device and the at least one locking member of the interlock mechanism are configured to cooperate with the second fitting member 230 detachably mounted on the second object 204, e.g., the drawer. In other words, in the second embodiment, the self-closing device and the interlock mechanism are separated from the slide rail assembly, e.g., the auxiliary supporting device 238, and therefore, the self-closing device and interlock mechanism can be adapted to the cabinet body and the drawer of the cabinet system without any slide rail assembly.

3. The resilient member 56 or 220 is detachably mounted on the base 52 or 216, which enables the resilient member 56 or 220 to be replaced by another resilient member with an elastic coefficient different from an elastic coefficient of the resilient member 56 according to practical demands.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A furniture assembly comprising:

a first object;

a second object displaceable relative to the first object;

a self-closing device arranged on the first object, the self-closing device comprising:

a base;

a working member movable relative to the base; and a resilient member;

an aiding member movable relative to the base of the self-closing device;

an interlock mechanism arranged on the first object, and the interlock mechanism comprising at least one locking member; and an actuating part arranged on the second object;

wherein when the second object is displaced from a retracted position toward an extended position, the actuating part drives the working member to move from an initial position to an engaging position, and when the actuating part drives the working member to move from the initial position to the engaging position, the resilient member generates a self-closing resilient force and the aiding member is driven to move from a first predetermined position to a second predetermined position;

wherein when the second object is located at the extended position and the working member returns to the initial position from the engaging position in response to the self-closing resilient force provided by the resilient member, the aiding member is located at the second predetermined position to retain the at least one locking member of the interlock mechanism at a locking position.

2. The furniture assembly of claim 1, wherein when the second object is displaced from the retracted position toward the extended position, the working member is driven by the actuating part, so as to drive the aiding member to move from the first predetermined position to the second predetermined position by the working member.

3. The furniture assembly of claim 1, wherein the base is connected to the first object, and the working member and the aiding member are movably mounted on the base.

4. The furniture assembly of claim 1, wherein the first object comprises a front end portion and a rear end portion, and the interlock mechanism is arranged adjacent to the rear end portion of the first object.

5. The furniture assembly of claim 1, wherein the first object and the second object are a fixed rail and a movable rail of a slide rail assembly, respectively.

6. The furniture assembly of claim 5, wherein the aiding member is driven to move from the second predetermined position to the first predetermined position during a displacement of the second object from the extended position toward the retracted position.

7. The furniture assembly of claim 6, further comprising a third object movably mounted between the first object and the second object, the third object being a middle rail of the slide rail assembly, and when the second object is displaced from the extended position toward the retracted position, the aiding member being driven by the third object to move from the second predetermined position to the first predetermined position.

8. The furniture assembly of claim 7, wherein a length of the third object is less than a length of the first object.

9. The furniture assembly of claim 1, wherein the resilient member is detachably mounted on the base.

10. The furniture assembly of claim 1, wherein the first object and the second object are a cabinet and a drawer, respectively.

* * * * *